United States Patent [19]
Nillesen

[11] 3,906,305
[45] Sept. 16, 1975

[54] CIRCUIT ARRANGEMENT FOR GENERATING A SAWTOOTH DEFLECTION CURRENT THROUGH A LINE DEFLECTION COIL

[75] Inventor: Antonius Hendrikus Hubertus Jozef Nillesen, Emmasingel, Eindhoven, Netherlands

[73] Assignee: U.S. Philips Corporation, New York, N.Y.

[22] Filed: Jan. 22, 1974

[21] Appl. No.: 435,533

[30] Foreign Application Priority Data

Feb. 1, 1973 Netherlands ....................... 7301421

[52] U.S. Cl. ................ 315/399; 315/393; 315/407; 315/408; 315/410

[51] Int. Cl.$^2$ ...................... H01J 29/70; H01J 29/76

[58] Field of Search ...... 315/27 GD, 27 TD, 24, 29, 315/391, 393, 399, 407, 408, 409, 410

[56] References Cited

UNITED STATES PATENTS 3,444,426 5/1969 Buechel .......................... 315/27 TD
3,691,422 9/1972 Boekhorst et al. ............. 315/27 GD

*Primary Examiner*—T. H. Tubbesing
*Assistant Examiner*—T. M. Blum
*Attorney, Agent, or Firm*—Frank R. Trifari; Henry I. Steckler

[57] ABSTRACT

A circuit arrangement for generating the line deflection current in which the line deflection coil forms part of a network which also includes a diode, a trace capacitor and a retrace capacitor. One or more further similar networks all having the same retrace time are arranged in series and this series arrangement is connected in parallel with a switch which may be that of a combined line deflection and supply voltage stabilizing circuit. The retrace voltage and thus the EHT across this series arrangement can be maintained constant while the line deflection current may be stabilized and/or East-West modulated. A difference current and a North-South correction current may be generated.

12 Claims, 8 Drawing Figures

Figure 1:
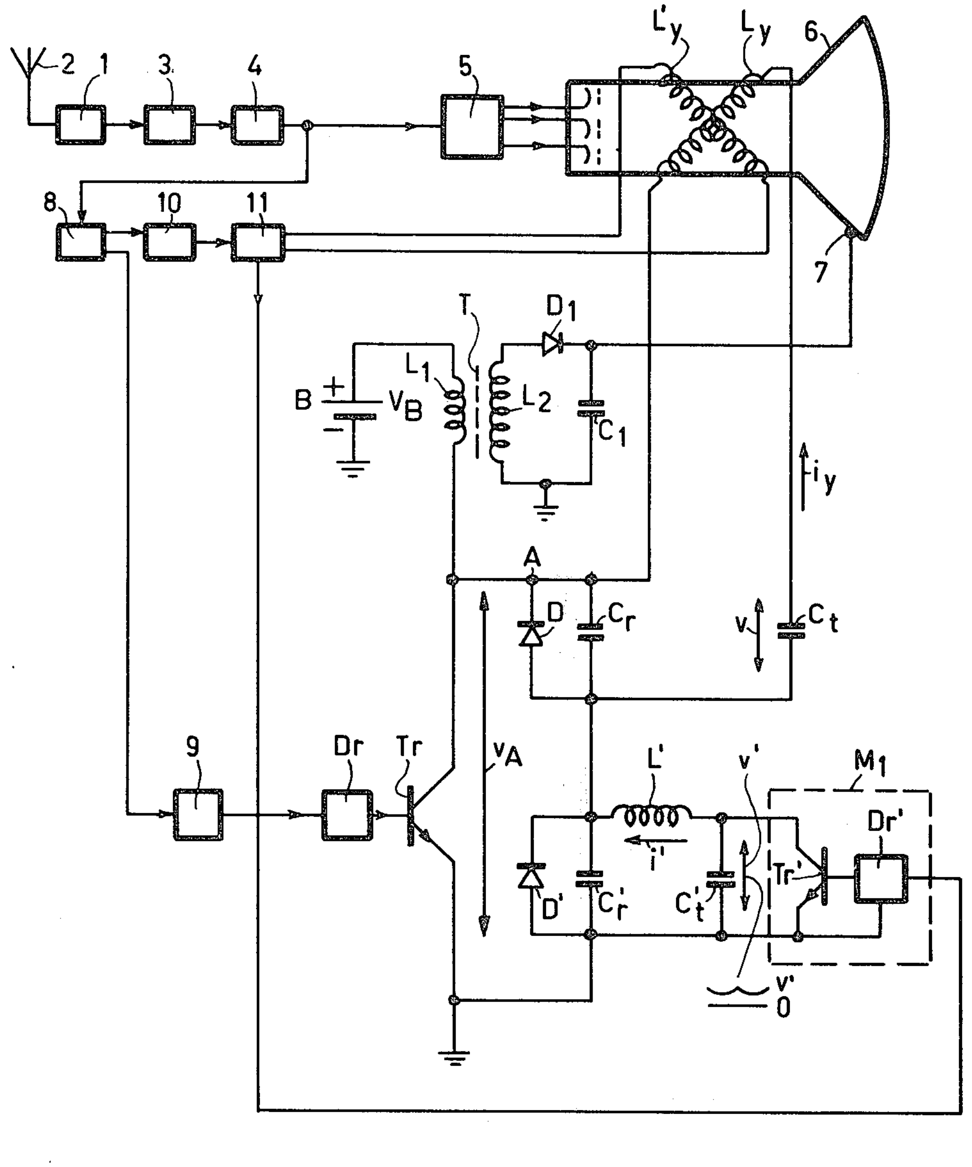

CIRCUIT ARRANGEMENT FOR GENERATING A SAWTOOTH DEFLECTION CURRENT THROUGH A LINE DEFLECTION COIL

The invention relates to a circuit arrangement for generating a sawtooth deflection current through a line deflection coil by means of a sawtooth network comprising a diode and the coil which coil cooperates during the trace time of the sawtooth current with a trace capacitance and during the retrace time of the sawtooth current with a retrace capacitance, the circuit arrangement furthermore including a supply voltage source and switching means which are blocked during the retrace time.

Such a circuit arrangement is described in U.S. Pat. No. 3,444,426. For the correction of the raster distortion in the horizontal direction, the so-called East-West correction of the displayed image in television display apparatus the supply voltage is the sum of a direct voltage and a field frequency parabola voltage. The latter voltage originates from the field deflection current generator which forms part of the same television display apparatus. As a result the line deflection current undergoes the field frequency modulation which is desired for the said correction.

A drawback of the known circuit arrangement is that the retrace pulses which are present during the retrace time across an inductor arranged between the switching means and the supply voltage source are field frequency modulated. A winding is coupled to this inductor with which the said pulses are transformed up and are applied to a rectifier for generating the EHT for the acceleration anode of the television display apparatus. An unwanted modulation of the EHT thus occurs. This also applies to auxiliary voltages which can be generated in known manner by other windings coupled to the said inductor.

A further drawback of the known arrangement is that it requires a very satisfactory stabilisation circuit for the supply voltage in order that both the direct voltages and the field frequency component thereof remain constant in spite of the inevitable fluctuations of the voltage derived from the electrical mains and applied to the said stabilisation circuit and in spite of the possible variations of the loads on the said windings.

The former drawback may be obviated by known arrangements in which two generators are used one of which provides at least the East West modulated share of the signal and which are decoupled relative to each other by means of a bridge circuit. In this case a transformer is necessary and the balance must be adjusted by means of a bridge coil which balance must remain under all circumstances.

It is an object of the invention to provide an arrangement without a bridge circuit and in which the supply voltage need not be stabilized and need not be field frequency modulated. To this end the arrangement according to the invention is characterized in that the circuit arrangement furthermore includes at least a second sawtooth network comprising a second diode and a second coil cooperating with a second trace capacitance and a second retrace capacitance, in which the retrace time of the current through the second coil is approximately equal to the retrace time of the deflection current, said sawtooth networks being connected together in which a manner that the two diodes are in series with each other and have the same conductivity direction, the series arrangement of the two diodes being connected in parallel across the switching means and the voltage across a trace capacitance being controllable by means of a control element.

It will be evident that the step according to the invention need not be limited to the East-West correction but may also be used, for example, for stabilisation against supply voltage variations or for generating a correction difference current and generally for obtaining a behaviour of the voltage across the trace capacitance cooperating with the line deflection coil and hence of the deflection current deviating from the behaviour of the supply voltage.

The invention will be further described with reference to the Figures shown in the drawing.

FIG. 1 shows a television display apparatus with a first embodiment of the circuit arrangement according to the invention and FIGS. 2 to 7 show further embodiments of the circuit arrangement according to the invention.

The television display apparatus of FIG. 1 has an RF tuning unit 1 for connection to an aerial 2, an IF amplifier 3, a detector 4 and a video amplifier with a colour decoder 5 which applies the colour signals to a colour display tube 6. This tube has an acceleration anode 7 and is provided with a coil $L_Y$ for the horizontal (line frequency) deflection and a coil $L'_Y$ for the vertical (field frequency) deflection.

Line synchronizing pulses which are applied to a line oscillator 9 are separated with the aid of a sync separator 8 from the output signal of detector 4, and field synchronizing pulses which are applied to a field oscillator 10. Oscillator 10 controls a field output stage 11 which supplies the deflection current for coil $L'_Y$. Line oscillator 9 controls a driver stage $D_r$ which applies switching pulses for a controlled switch, for example, a switching transistor $T_r$ of a line deflection output circuit to be further described.

A trace capacitor Ct is arranged in series with line deflection coil $L_Y$ and a diode D with the given conductivity direction and a retrace capacitor $C_r$ are connected in parallel with the series arrangement thus constituted. Capacitor $C_r$ may alternatively be arranged in parallel across coil $L_Y$. The said four elements only represent the principle circuit diagram with the main components of the deflection section. This section may be provided, for example, in known manner with one or more transformers for mutual coupling of the elements, with circuits for centring and linearity correction and the like.

One end or a tap of a primary winding $L_1$ of a transformer T is connected to the collector of transistor $T_r$ which is of the npn type and is connected to the junction A of elements D, $C_r$ and $L_Y$. The positive terminal of a direct voltage source B whose negative terminal is connected to ground is connected to the other end of winding $L_1$.

The ends of elements D, $C_r$ and $C_t$ not connected to deflection coil $L_Y$ are connected to the junction of a diode D', a capacitor $C'_r$ and a coil L'. A capacitor $C'_t$ is arranged in series with coil L' and the free ends of elements $D'_1$, $C'_r$ and $C'_t$ are connected to ground. The conductivity direction of diode D' is the same as that of diode D, that is to say, the anode of diode D' is connected to ground. Elements D', L', $C'_r$ and $C'_t$ constitute a network which is of the same structure as the network constituted by the elements D, $L_Y$, $C_r$ and $C_t$, but optionally at a different impedance level.

A modulation source $M_1$ is arranged in parallel with the capacitor $C'_t$. This modulation source includes a transistor $T_r$, whose emitter is connected to ground and whose collector is connected to the junction of coil L' and capacitor $C'_t$, as well as a driver stage $D_r'$ controlling the base electrode of $T_r'$ which stage is connected to the field output stage 11. Driver stage $D_r'$ derives from the signals of the field output stage a field frequency parabolically varying modulation control signal, which control signal serves for the East-West raster correction of the line deflection current. This signal varies at the field frequency but may be considered to be constant during a line period. Since the raster distortion to be corrected is generally pin-cushion shaped it is known that the introduced modulation must be such that the amplitude of the line deflection current varies with a parabolic envelope while the peak of the parabola occurs in the middle of the field trace time and coincides with the maximum amplitude.

Other windings across which voltages are present serving as supply voltages for other parts of the television display apparatus are wound on the core of transformer T. One of these windings, winding $L_2$, is shown in FIG. 1 and generates the EHT for the acceleration anode 7 of television display tube 6 with the aid of an EHT rectifier $D_1$ across a smoothing capacitance $C_1$. The auxiliary supply voltages thus obtained and the EHT must not undergo the same field frequency modulation as the line deflection current.

After the commencement of the trace time diodes D and D' conduct. The voltage across capacitors $C_t$ and $C'_t$ is applied to coils $L_Y$ and L', respectively, so that a sawtooth current flows through each coil. The current $i_Y$ through coil $L_Y$ is the line deflection current. Before the middle of the trace time the base of transistor $T_r$ receives a control signal so that it is rendered conducting. Approximately in the middle of the trace time the two current reverse their direction. If current $i_Y$ is larger than the current $i'$ through coil L', current $i_Y$ flows through transistor $T_r$, while the difference $i_Y$-$i'$ flows through diode D'. Diode D is connected in parallel with the series arrangement of the transistor $T_r$ being in the bottomed state and diode D' and is therefore substantially without any voltage although it does not conduct. In the reverse case in which current $i'$ is larger than current $i_Y$, current $i'$ flows through transistor $T_r$ and the difference $i'$-$i_y$ flows through diode D and diode D' is without current and voltage.

At the end of the trace time transistor $T_r$ and hence the diode which was conducting is cut off. A substantially sinusoidal retrace voltage is produced across capacitors $C_r$ and $C'_r$. At the instant when these voltages become zero again diodes D and D' simultaneously become conducting: this is the commencement of a new trace time. The condition therefor is that the retrace times determined by diodes D and D' and elements Cr, Ly, Ct and $C'_r$, L', $C'_t$ are substantially equal, which is the case when the resonant frequencies of the individual networks are equal, whereby the retrace time is a known function of the resonant frequency.

Since transistor Tr' is connected in parallel with capacitor $C'_t$ there is, as it were, a field frequency varying load on the voltage $v'$ present across this capacitor. When the capacitance of this capacitor is chosen to be such that its impedance for the field frequency is not negligibly small relative to the output impedance of source $M_1$, voltage $v'$ and also the voltage v across capacitor $C_t$ will vary at the field frequency, provided that the same choice is made for capacitor $C_t$. The sum of the mean values of voltages $v$ and $v'$ is in fact equal to the voltage $V_B$ of source B since no direct voltage can remain present across the inductors $L_1$, $L_Y$ and L'. The amplitude of current $i_Y$ undergoes the same variation as the voltage v. The control signal of transistor Tr' must be such that voltage $v$ and consequently the field frequency envelope of current $i_Y$ has the abovementioned desired shape.

Voltage v is substantially equal to the mean value of the voltage present across capacitor $C_r$ and is proportional to the retrace voltage thereacross. Likewise voltage $v'$ is substantially equal to the mean value of the voltage present across capacitor $C'_r$ and is proportional to the retrace voltage thereacross. According to the invention, as already stated, the retrace times of networks D, $C_r$, $L_y$, $C_t$ and D', $C'_r$, L', $C'_t$ are substantially equal. Both retrace voltages are therefore equal in shape and both proportionality constants are equal. The voltage $v_A$ at point A is equal to the sum of the voltages present across capacitors $C_r$ and $C'_r$ and the peak value of voltage $v_A$ relative to its mean value i.e. the voltage $V_B$ of source B is in the same relation as are the retrace voltages across the capacitors $C_r$ and $C'_r$ relative to voltages $v$ and $v'$. If voltage $V_B$ is constant, the peak value of voltage $v_A$ is likewise constant. It follows that the amplitude of the voltage present across winding $L_1$ is also constant which means that the EHT on electrode 7 as well as the auxiliary supply voltage do not undergo a field frequency modulation in spite of the modulation of deflection current $i_Y$.

The variation of voltage $v'$ is opposite to that of the voltage $v$ so that voltage $v'$ must be minimum in the middle of the field trace time. The same result as above may alternatively be achieved by not providing the modulation source in parallel with the capacitor $C'_t$ but with capacitor $C_t$ in which the polarity of the control signal of transistor $T_r'$ must be reversed relative to the control signal of FIG. 1. Another modification is that in which transistor Tr' is not provided as a varying load but as a current or voltage source. The latter case occurs when transistor Tr' is arranged, for example, as an emitter follower.

In practice the ratio between the inductances of coils $L_Y$ and L' will be chosen to be approximately equal to the ratio of the mean trace voltages which are desired thereacross. When for example the total trace voltage of $v + v'$ is approximately 150 volts, the inductance of coil $L'$ may be equal to a quarter of that of coil $L_Y$ in case of a mean direct voltage component of voltage $v'$ of approximately 30 V. A practical embodiment is approximately 270 $\mu$H and 1.2 mH. By adjusting the direct voltage component of voltage $v'$ the width of the picture displayed is adjusted while the amplitude of the field frequency component is adjusted for an undistorted picture.

Figure 2:
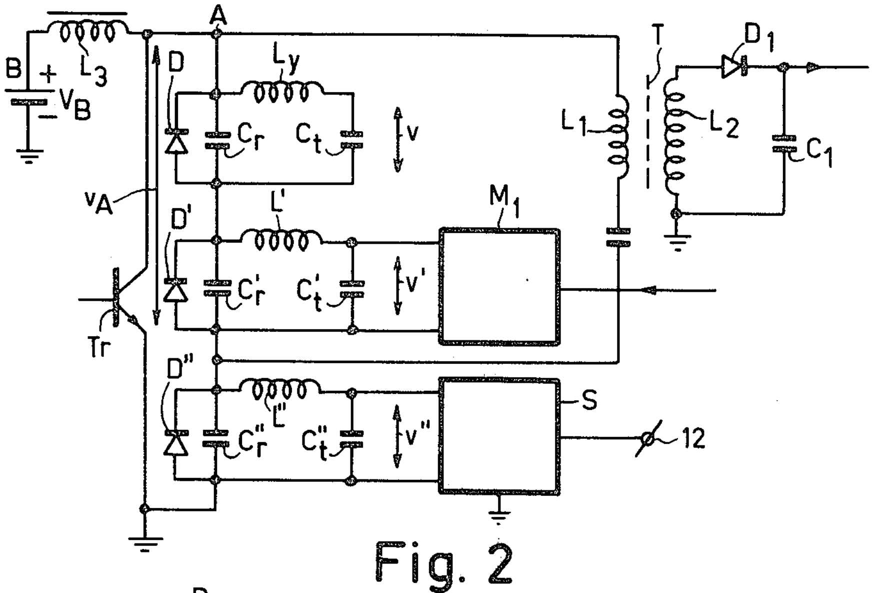

It has been assumed in the foregoing that the voltage $V_B$ is constant. This means that this voltage must be stabilized against fluctuations in the electrical mains, possible variations of the different loads on transformer T and against hum voltages originating from the mains. Such a costly stabilisation is not necessary with the embodiment of FIG. 2. In FIG. 2 only the important elements are shown. The arrangement includes the same networks D, $C_r$, $L_Y$, $C_t$ and D', $C'_r$, L', $C'_t$ and modulation source $M_1$ likewise as those of FIG. 1. The junction A of the collector of transistor Tr and the former network is connected through a choke L3 to source B. Furthermore it includes a third similar network D'', $C''_r$, L'', $C''_t$ which is in series between the two former networks and ground to which in the same manner as source $M_1$ a stabilisation circuit S is connected to the second network which has the same retrace time as the two former networks. Stabilisation circuit S has a terminal 12 to which information is applied regarding either variations in the voltage $v + v'$, or those in the peak value of the voltage $v_A$ present across the series arrangement of networks D, $C_r$, $L_Y$, $C_t$ and D', $C'_r$, L', $C'_t$. It includes a reference voltage source at which the said information is compared so that such a variation of the voltage $v''$ present across capacitor $C''_t$ is obtained that voltage $v_A$ is maintained constant without the voltage at the collector of transistor $T_r$ being constant. The primary winding $L_1$ of transformer T is arranged through an isolation capacitor in parallel with the series arrangement of networks D, $C_r$, $L_y$, $C_t$ and D', $C'_r$, L', $C'_t$. The EHT and the auxiliary supply voltages are thus independent of the variations in the voltage $V_B$. As is the case in FIG. 1 they are also free from field frequency modulation, while current $i_Y$ undergoes the desired modulation. It will be evident that the arrangement of FIG. 2 may alternatively be used without network D', $C'_r$, L', $C'_t$, for example in a monochrome television display apparatus in which no East West modulation is used. In this case the voltage $v$ is maintained constant so that the retrace voltage is suitable for generating the EHT.

Figure 3:
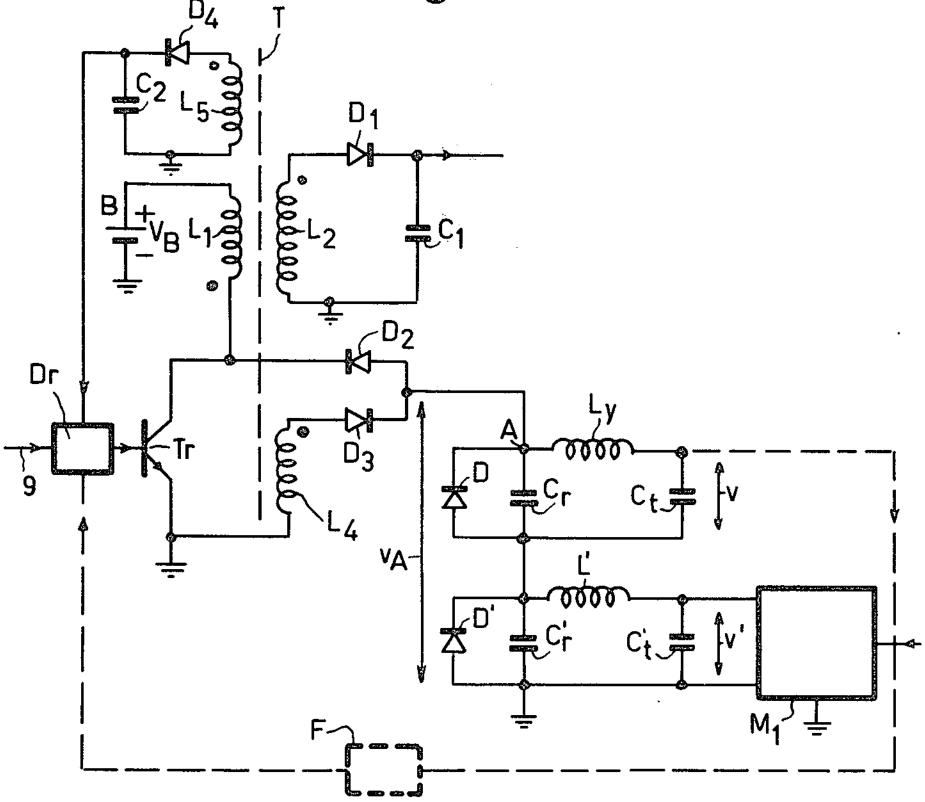

FIG. 3 shows a modification of the arrangement according to the invention in which likewise as in FIG. 2 voltage $V_B$ need not be stabilized. In this Figure use is made of a circuit arrangement which is described in the publication "IEEE Transactions on Broadcast and Television Receivers", August 1972, vol. BTR-18 no. 3, pages 177 to 182 and which is a combination of a line deflection and a switch supply voltage stabilizing circuit. A diode $D_2$ having the same conductivity direction as the collector current of the transistor is arranged in series between point A and transistor $T_r$, while the primary winding $L_1$ of transformer T is arranged between source B and the junction of transistor $T_r$ and diode $D_2$. The series arrangement of a diode $D_3$ and a secondary winding $L_4$ of transformer T is arranged between point A and ground, the cathode of diode $D_3$ being connected to point A. The winding sense of the windings of transformer T shown is denoted by polarity dots in the Figure. Driver circuit Dr has a comparison stage and a modulator so that the conductivity time of transistor Tr can be controlled.

The peak value of voltage $v_A$ may be maintained constant in the embodiment of FIG. 3 in spite of variations in the voltage $V_B$ and in spite of the field frequency modulation of voltages $v$ and $v'$ if the voltage at the junction of coil $L_Y$ and capacitor $C_t$ is applied through a lowpass filter F to the comparison stage of driver circuit Dr. This is shown by broken lines in the Figure. The output signal from the lowpass filter is in fact the mean value of the voltage $v + v'$. A condition therefor is that filter F does not pass a line frequency component but passes a possibly present field frequency component. In the same manner voltage $v_A$ may be applied to filter F. In FIG. 3 the control is brought about because the voltage is rectified across a secondary winding $L_5$ of transformer T by means of a peak rectifier $D_4$, $C_2$ while the direct voltage thus obtained is applied to driver circuit Dr for the control of the conductivity time of transistor Tr. The amplitude of the voltage across winding $L_5$ and consequently that across voltage $v_A$ which is proportional thereto is maintained constant by the control of the said conductivity/time. In the same manner the voltage $v_A$ itself may also be applied to a peak rectifier.

Figures 4A, 4B:
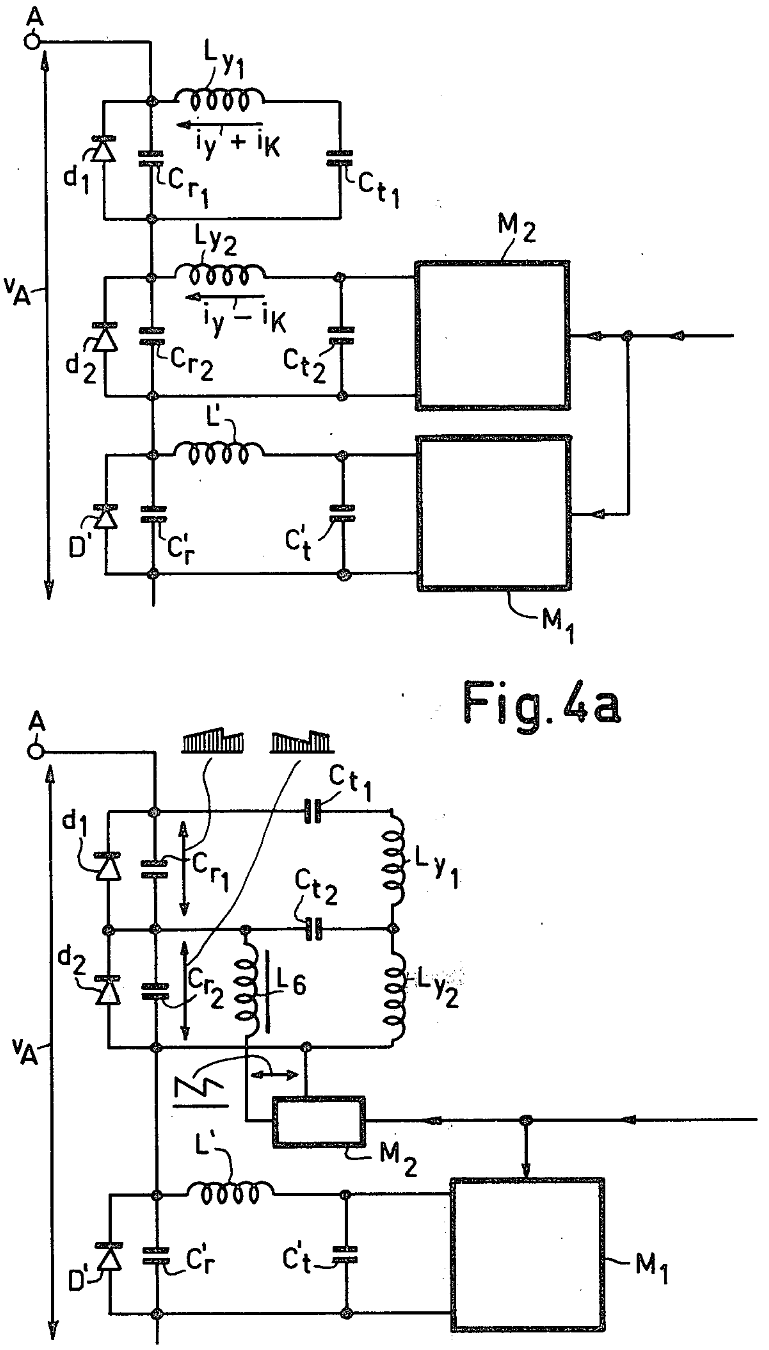

It may be noted that it is possible in the embodiments of FIGS. 2 and 3 to give the voltage $v_A$ any desired variation by controlling the circuits S and $D_r$. The scope of the invention is also applicable to the embodiment of FIG. 4a in which the section to the left of point A (not shown) can be formed in the same manner as in FIG. 1 or in FIG. 3. In FIG. 4a line deflection coil $L_Y$ is split up into two equal coil halves $L_{Y1}$ and $L_{Y2}$ which are incorporated in two substantially identical networks $d_1$, $C_{r1}$, $L_{Y1}$ $C_{t1}$ and $d_2$, $C_{r2}$, $L_{Y2}$, $C_{t2}$. These networks are arranged in series with the network $D'_1$, $C'_r$, L', $C'_t$ for the East West correction in which modulation source $M_1$ is arranged in parallel with capacitor $C'_t$. A modulation source $M_2$ may be arranged in parallel with capacitor $C_{t2}$ for causing such a variation of the voltage across this capacitor that a correction difference circuit $i_K$ in one coil half for example $L_{Y1}$ is added to deflection current $i_Y$ and is subtracted from deflection current $i_Y$ in the other coil half, for example, $L_{Y2}$. As is known coil halves $L_{Y1}$ and $L_{Y2}$ then generate a correction quadripolar field which eliminates deflection errors. Such a quadripolar field is described in U.S. Pat. No. 3,440,483 in which the instantaneous intensity of current $i_K$ is proportional to the product of the instantaneous intensities of the two deflection currents and by which anisotropic astigmatic deflection errors can be eliminated. The peak value of voltage $v_A$ across the series arrangement of the three networks is maintained constant as has been described with reference to FIGS. 1, 2 or 3.

The embodiment of FIG. 4*a* has the drawback that a DC component of correction current $i_K$ flows through coil half $L_{Y2}$ but not through coil half $L_{Y1}$ which may cause errors. The embodiment of FIG. 4*b* does not have this drawback: here the modulation source $M_2$ is connected through a choke $L_6$ to the junction of diodes $d_1$ and $d_2$ while coil $L_6$ blocks line frequency signals but not field frequency signals. The output voltage from source $M_2$ is field frequency sawtooth shaped. Capacitor $C_{t2}$ is included between coil $L_6$ and the junction of coil halves $L_{Y1}$ and $L_{Y2}$ so that this capacitor forms part of the two networks. A field frequency modulated line frequency pulsatory voltage is produced at the junction of diodes $d_1$ and $d_2$. The envelope of the retrace voltage across a diode for example $d_2$ is a decreasing sawtooth and that of the retrace voltage across the other diode, for example, $d_1$ is an increasing sawtooth. The sum of these voltages shown in the Figure is in fact constant. The currents produced by these voltages through coils $L_{Y1}$ and $L_{Y2}$ are proportional to the integral of the line frequency voltages across the coils and are therefore sawtooth shaped. Thus these currents are the desired currents $i_Y + i_K$ and $i_Y - i_K$. It will be evident that other known correction difference currents can be generated in a similar manner.

Figure 5:
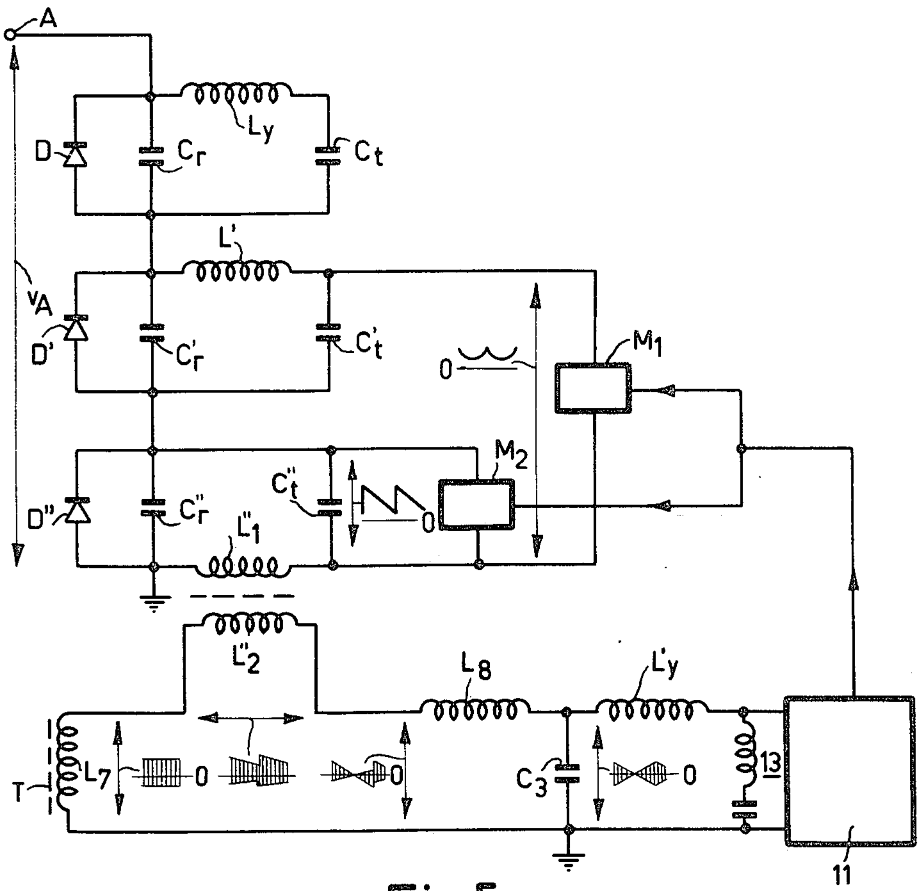

FIG. 5 shows a modification in which the circuit arrangement according to the invention generates a current for the correction in the vertical direction the so-called North South correction of the displayed picture.

The deflection network D $C_r$, $L_Y$, $C_t$ is in series with the network D', $C'_r$, L', $C'_t$ for the East West correction and with a third similar network D'', $C''_r$, $L''_1$, $C''_t$. Modulation source $M_2$ is connected in parallel with capacitor $C''_t$ with a field frequency sawtooth signal and modulation source $M_1$ is connected in parallel with the series arrangement of capacitors $C'_t$ and $C''_t$ with a field frequency parabola signal. Because the sum of the voltage across capacitors $C_t$, $C'_t$ and $C''_t$ is constant (= the constant direct voltage component of voltage $v_A$) and because the sum of the voltage across the capacitors $C'_t$ and $C''_t$ varies parabolically, the voltage across capacitor $C_t$ likewise varies parabolically and no sawtooth component is present in this voltage. Consequently no field frequency sawtooth component is present in the line deflection current.

A line frequency pulsatory voltage having a field frequency sawtooth envelope is present across a winding $L''_2$ coupled to winding $L''_1$. A line frequency pulsatory voltage with a constant amplitude which is provided by a winding $L_7$ of transformer T is subtracted from the said voltage. These waveforms are shown in FIG. 5. Winding $L''_2$ is connected in series with a coil $L_8$ and the field deflection coil $L'_Y$ which coil is connected to field deflection current generator 11. A capacitor $C_3$ is arranged between the junction of coils $L_8$ and $L'_Y$ are ground while the connection terminal of coil $L'_Y$ at generator 11 is connected to ground by means of an absorption circuit 13 for line frequency signals and the junction of winding $L''_2$ and coil $L_8$ is connected to ground through windings $L''_2$ and $L_7$ for field frequency signals. The voltage present between the junction of winding $L''_2$ and coil $L_8$ is line frequency pulsatory with a field frequency sawtooth envelope which becomes zero in the middle of the field trace time.

A line frequency sinusoidal voltage having a field frequency sawtooth envelope is produced in known manner across the capacitor $C_3$, which voltage produces a cosine-shaped current through field deflection coil $L'_Y$ which current is superimposed on the field deflection current and has substantially the required parabolic shape. This current is therefore the North-South correction current.

No requirement has been imposed in the foregoing on the capacitors $C_t$ and $C'_t$ except for the fact that the impedance thereof must not be too small for the field frequency. In practice the capacitor $C_t$ is used for the so-called S correction. It is known for example from the publication "Philips Application Information No. 268: All Transistor 110° Colour Television" that the linearity of the line deflection can be improved when the S-correction is more East-West modulated than the deflection current itself which can be realized with the embodiment of FIG. 6. In this Figure capacitor $C'_t$ forms part of the two networks D, $C_r$, $L_Y$, $C_t$ and D', $C'_r$, L', $C'_t$ while modulation source $M_1$ is connected through a coil $L_9$ to the junction of diodes D and D'. The ratio of the capacitances of the capacitors $C_t$ and $C'_t$ is given by the desired modulation of the S-correction which modulation is in turn determined by the geometrical properties of the television display tube. The embodiment of FIG. 1 is not possible in this case because the junction of capacitor $C_t$ and coil L' is connected to ground during the line trace time. This is not the case in FIG. 6 due to the presence of capacitor $C'_t$. Similarly as in the embodiment of FIG. 4b no direct current flows through coil L' in FIG. 6.

In the embodiments described the inductor present between point A and the positive terminal of source B and consequently being in parallel across the networks has not been taken into account. This is justified as long as this inductor has a large impedance for the line frequency. However, the said parallel impedance cannot be considered to be infinitely large, when a parasitic capacitance, which is not negligible, is present across this inductor, for example, choke $L_3$ in FIG. 2, to which capacitance is contributed by the part of the circuit arrangement around the switch, for example, transistor Tr or a thyristor, as well as by the EHT rectifier circuit. The result is that the resonant frequencies of the individual networks are no longer equal and consequently neither their retrace times. It is evident that the retrace times will be equal when the resonant frequency of the circuit constituted by the said inductor and the capacitance present thereacross is equal to those of the networks.

Figures 6, 7:
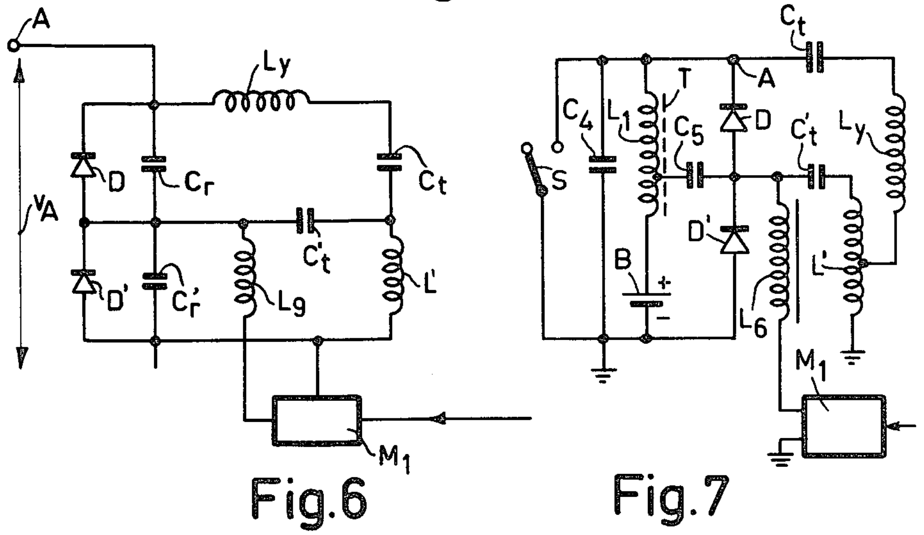

However, the real capacitance $C_p$ may be so large that the said resonant frequency is too low. During the retrace time both capacitor $C_p$ and the total primary inductor $L_p$ of transformer T in FIG. 1 are in parallel across the series arrangements $C_r$, $C'_r$ and $L_y$, L' (the capacitances of capacitors $C_t$ and $C'_t$ are too large to have an essential influence). Capacitors $C_r$ and $C'_r$ thus constitute a capacitor potential divider so that the above-described circuit may be replaced in known manner by a circuit having an inductive potential divider. This is shown in FIG. 7. A capacitor $C_4$ is arranged between point A and ground and a capacitor $C_5$ is arranged between a tap in winding $L_1$ and the junction of diodes D and D', which capacitors $C_r$ and $C'_r$ are omitted. The capacitances of capacitors $C_4$ and $C_5$ and the position of the tap can be determined in a simple manner with reference to capacitor $C_p$ and the capacitance of capacitors $C_r$ and $C'_r$. It may be noted that capacitors $C_4$ and $C_5$ actually take over the task of the retrace capacitors of the two networks.

In the embodiment of FIG. 7 the series arrangement of $L_4$, $C_t$ is not connected to the junction of elements $C'_t$ and L' but to a tap on coil L' and this for the following reason. In the middle of the field trace time the East-West modulation is deepest. When in addition, as described above, the S correction is more modulated than the deflection current, it is possible without this step for the current through diode D' to become negative, i.e. diode D' would stop conducting. When the said step is used, a current flows through this diode which is the sum of the current in the original embodiment and of a current proportional to current $i_y$ and has therefore a greater intensity. The position of the tap may be chosen to be such that it is ensured that diode D' continues to conduct under all circumstances during the first half of the line trace time. Such a step is also possible for the embodiments of FIG. **4*b* and 6 in which the retrace capacitors can be formed as in FIG. 7** or in another manner (for example by means of a capacitor connected in parallel with coil $L_Y$ and one between the tap of coil L' and ground).

What is claimed is:

1. A circuit arrangement for generating a sawtooth deflection current having trace and retrace times through a first line deflection coil, said circuit comprising a first sawtooth network comprising a first diode adapted to be coupled to the coil, a first trace capacitance coupled to said first diode, and a first retrace capacitance coupled to said first diode, the circuit arrangement furthermore including a switching means adapted to be coupled to a voltage source and which is blocked during the retrace time, a second sawtooth network comprising a second diode, a second coil coupled to said second diode, a second trace capacitance coupled to said second coil, and a second retrace capacitance coupled to said second diode, the retrace time of the current through the second coil being approximately equal to the retrace time of the deflection current, means for coupling said sawtooth networks together and for providing that the two diodes are in series with each other and have the same conductivity direction, the series arrangement of the two diodes being coupled in parallel across the switching means, and first control element means for controlling the voltage across one of said trace capacitances.

2. A circuit arrangement as claimed in claim 1, further comprising a third sawtooth network having a third diode, a third coil coupled to said third diode, a third trace capacitance coupled to said third coil and a third retrace capacitance coupled to said third diode, the retrace time of the current through the third coil being approximately equal to the retrace time of the deflection current, said coupling means coupling all sawtooth networks together and providing that the diodes of the networks are coupled together in series and with the same conductivity direction and that the series arrangement of the diodes is coupled in parallel across the switching means, and means for controlling the voltages across all trace capacitors but one.

3. A circuit arrangement as claimed in claim 1, wherein the switching means comprises a series arrangment of a fourth diode and a transistor, which fourth diode has the same conductivity direction as the collector current of the transistor, a series arrangement coupled to the junction of said fourth diode and said transistor and including an inductive element and the supply voltage source, a fifth diode coupled to said element and to the sawtooth networks, the conductivity time of the transistor being controllable.

4. A circuit arrangement as claimed in claim 3, further comprising means for applying a voltage proportional to the voltage present during the retrace time across the series arrangement of the diodes of the sawtooth networks to said transistor for controlling the conductivity time of the transistor.

5. A circuit arrangement as claimed in claim 1, wherein the voltage present during the retrace time across part of the diodes of the sawtooth networks is substantially constant and further comprising a transformer having a winding coupled to said part of said diodes.

6. A circuit arrangement as claimed in claim 2, further comprising a second control element means for controlling the sum of the voltage across the said first and second trace capacitances.

7. A circuit arrangement as claimed in claim 1, wherein said first trace capacitance comprises a plurality of capacitors, one of said capacitors comprising the trace capacitance cooperating with the coil of said second sawtooth network.

8. A circuit arrangement as claimed in claim 7, wherein said first and second coils comprise two substantially identical line deflection coils.

9. A circuit arrangement as claimed in claim 1, wherein the control element means comprises a stabilizing circuit means for stabilizing the voltage present during the retrace time across the joint diodes of the second sawtooth network.

10. A circuit arrangement as claimed in claim 1 further comprising a field deflection current generator, wherein the control element comprises a modulation source coupled to the field deflection current generator.

11. A circuit as claimed in claim 10, wherein the controlled voltage across said one capacitance is field frequency sawtooth-shaped.

12. Television display apparatus as claimed in claim 10, characterized in that the controlled voltage is field frequency sawtooth-shaped.

* * * * *